US009518372B2

(12) United States Patent
Clemons

(10) Patent No.: US 9,518,372 B2
(45) Date of Patent: Dec. 13, 2016

(54) ADJUSTMENT MECHANISM FOR ADJUSTING JAWS OF SHEAR

(71) Applicant: Caterpillar Inc., Peoria, IL (US)

(72) Inventor: John Kevin Clemons, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 13/870,416

(22) Filed: Apr. 25, 2013

(65) Prior Publication Data
US 2014/0317935 A1 Oct. 30, 2014

(51) Int. Cl.
*E02F 3/96* (2006.01)
*B23D 17/00* (2006.01)
*B23D 35/00* (2006.01)
*E02F 9/00* (2006.01)

(52) U.S. Cl.
CPC ............ *E02F 3/965* (2013.01); *B23D 17/00* (2013.01); *B23D 35/005* (2013.01); *E02F 9/006* (2013.01)

(58) Field of Classification Search
CPC ......... E02F 3/965; E02F 9/006; B23D 35/005; B23D 17/00
USPC .............. 30/134, 376, 176, 186, 187, 188, 191,30/192, 193, 236, 244, 124, 135, 228, 92, 379; 241/266, 101.73; 72/144, 326, 330
See application file for complete search history.

(56) References Cited

U.S. PATENT DOCUMENTS

| 3,688,405 A | 9/1972 | Dutra, Jr. |
| 4,616,417 A | 10/1986 | Gross |
| 4,686,767 A * | 8/1987 | Ramun et al. ............... 30/134 |
| 4,776,093 A | 10/1988 | Gross |
| 5,187,686 A * | 2/1993 | Tran et al. ............. 365/189.11 |
| 5,187,868 A * | 2/1993 | Hall ........................... 30/134 |
| 5,992,023 A | 11/1999 | Sederberg et al. |
| 6,119,970 A * | 9/2000 | LaBounty et al. ....... 241/101.73 |
| 7,216,575 B2 | 5/2007 | Alseth et al. |
| 8,104,384 B2 * | 1/2012 | Wilkins et al. ............... 83/13 |
| 2003/0136008 A1* | 7/2003 | Lin ............................. 30/250 |
| 2005/0262700 A1* | 12/2005 | Alseth et al. ................ 30/134 |
| 2011/0225829 A1 | 9/2011 | Raihala |

FOREIGN PATENT DOCUMENTS

| CA | 2176418 | 11/1997 |
| WO | 0168992 | 9/2001 |

OTHER PUBLICATIONS

PCT/US2014/033683 International Search Report and Written Opinion, Oct. 24, 2014, 9 pages.

* cited by examiner

*Primary Examiner* — Ghassem Alie
(74) *Attorney, Agent, or Firm* — Finnegan, Henderson, Farabow, Garrett & Dunner, LLP

(57) ABSTRACT

A hydraulic shear including a first jaw, a second jaw, a pivot pin, and an adjustment mechanism is provided. The first jaw includes a first and second sidewall defining a first and second opening therethrough. The second jaw is disposed between the first and second sidewalls and includes a third opening. The pivot pin extends through the first, second, and third openings to pivotally connect the first and second jaws. The adjustment mechanism is coupled to the first jaw, the second jaw, and the pivot pin. The adjustment mechanism slidably adjusts a position of the second jaw on the pivot pin with respect to first and second sidewalls of the first jaw.

17 Claims, 4 Drawing Sheets

ADJUSTMENT MECHANISM FOR ADJUSTING JAWS OF SHEAR

TECHNICAL FIELD

The present disclosure relates to a shear, for e.g. a hydraulic shear, and more particularly to an adjustment mechanism for adjusting jaws of the shear.

BACKGROUND

Shears employed on heavy construction machinery include a pair of jaws with one or more blades positioned thereon. The jaws may include a pivoting jaw and a fixed jaw. The jaws may be mounted on a pivot pin such that the one of the jaws may be pivotable relative to a fixed jaw therein. The pivoting jaw moves the associated blade with respect to the blade on the fixed jaw to provide shearing and crushing forces to an object. Such shears may further employ shim plates and low-friction plates mounted on the pivot pin and adjacently located to each of the jaws. The shim plates are configured to maintain a pre-determined amount of tolerance between the jaws while the low-friction plates serve to reduce friction between the jaws during operation.

During an operation of the shear, the jaws may be opened and closed several times to accomplish shearing of objects. However, upon frequent opening and closing of the jaws over a prolonged period of time, the shim plates and the low-friction plates may be subject to wear from the jaws. This wear may cause a slack in the shim plates and the low-friction plates thus rendering the pivotable jaw susceptible to slide or wobble on the pivot pin during operation. Therefore, subsequent use of the shear thereafter may entail an increased amount of effort from the jaws to accomplish the shearing or crushing of the objects.

One way of compensating for slack in the plates stacked and disposed on the pivot pin is to replace the plates. However, replacing the plates altogether may require operating personnel to disassemble the jaws and re-insert new plates. Further, additional costs are incurred by way of replacement and downtimes of the shear. Furthermore, this method may be tedious and cumbersome while also requiring expensive tools to pivotally unfasten and re-fasten the jaws to each other.

U.S Published Application 2011/0225829 ('829 application) discloses a heavy duty, configurable shear/crusher demolition tool having an upper jaw, a lower jaw, and a pivot group connecting the upper jaw and the lower jaw. A configurable number of tooth holders are mounted on the upper jaw and the lower jaw. A configurable number of teeth are removably mounted to the tooth holders. A configurable number of shear blade holders are mounted on the upper jaw and the lower jaw. A configurable number of shear blades are removably mounted to the shear blade holders.

SUMMARY OF THE DISCLOSURE

In one aspect, the present disclosure provides a hydraulic shear including a first jaw, a second jaw, a pivot pin, and an adjustment mechanism. The first jaw includes a first and second sidewall defining a first and second opening therethrough. The second jaw is disposed between the first and second sidewalls and includes a third opening. The pivot pin extends through the first, second, and third openings to pivotally connect the first and second jaws. The adjustment mechanism is coupled to the first jaw, the second jaw, and the pivot pin. The adjustment mechanism slidably adjusts a position of the second jaw on the pivot pin with respect to first and second sidewalls of the first jaw.

In another aspect, the present disclosure provides a shear including a fixed jaw, a pivoting jaw, a pivot pin extending through openings on the fixed and pivoting jaws, and an adjustment mechanism. The adjustment mechanism is coupled to the fixed jaw, the pivoting jaw, and the pivot pin. The adjustment mechanism slidably adjusts a position of the pivoting jaw on the pivot pin towards the fixed jaw.

Other features and aspects of this disclosure will be apparent from the following description and the accompanying drawings.

DETAILED DESCRIPTION

Figure 1:
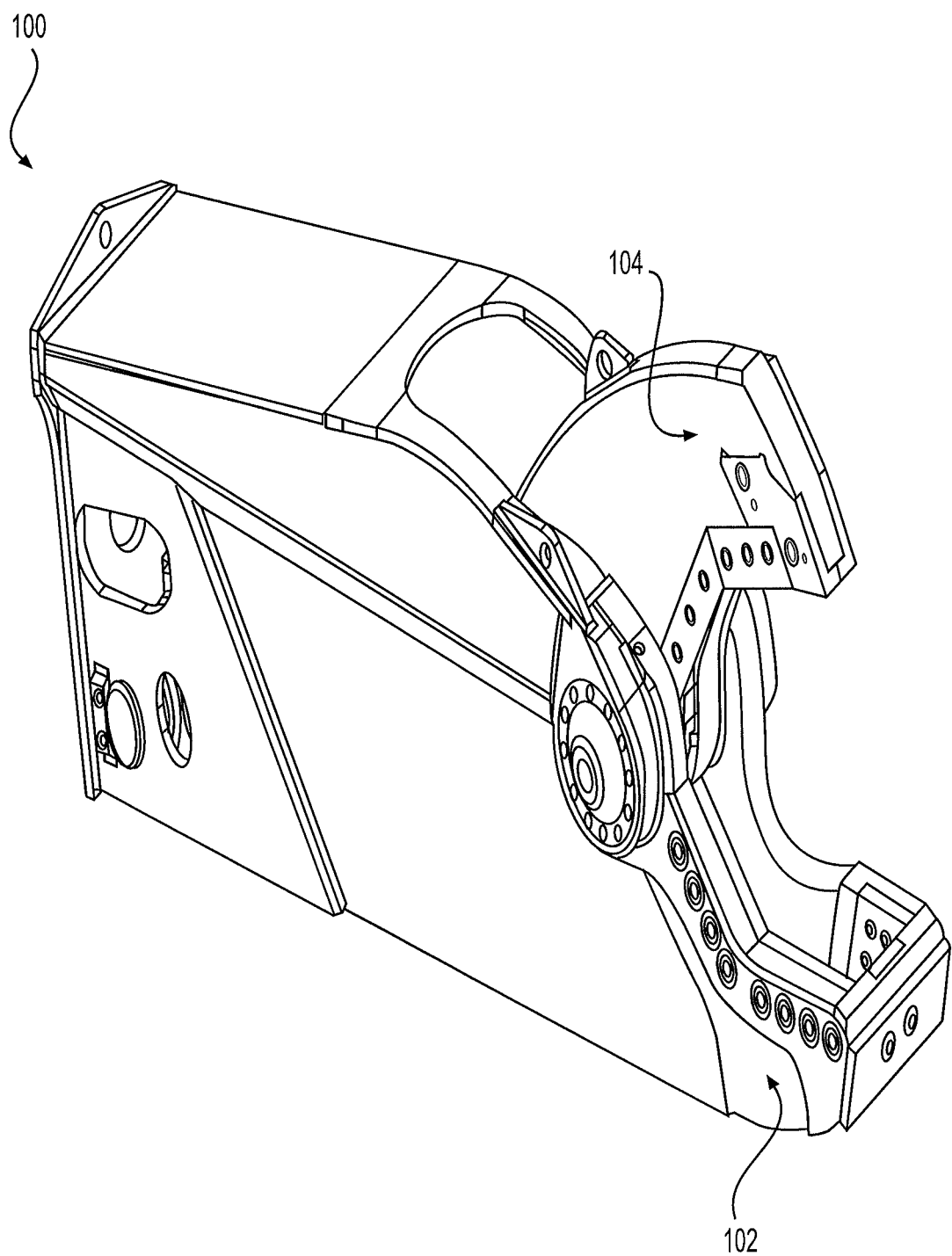
FIG. 1 is a front perspective view of a shear in accordance with an exemplary embodiment of the present disclosure.

The present disclosure relates to an adjustment mechanism for adjusting jaws of the shear. FIG. 1 shows a front perspective view of a shear 100 in accordance with an exemplary embodiment of the present disclosure. In an embodiment, the shear 100 may be of a type typically used on heavy construction machinery to shear earth materials, timber, or construction materials. In one embodiment, the shear 100 may be a hydraulic shear configured to be hydraulically powered using actuators and trunnion linkages. In another embodiment, the shear 100 may be an electrically powered shear. Although the description focuses on hydraulic shears, it can be appreciated that the apparatus and methods can be similarly applied to other types of shears 100.

Figure 2:
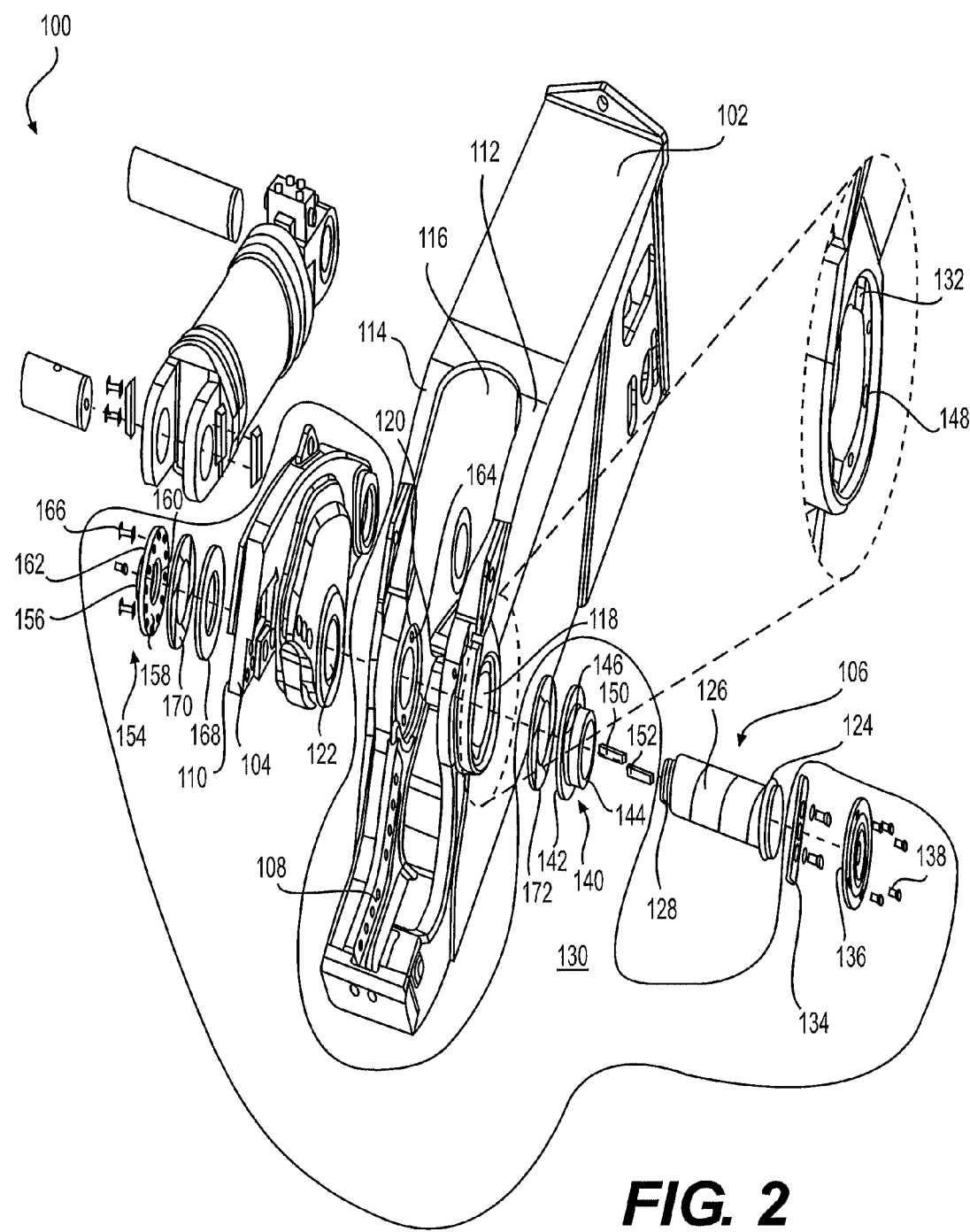
FIG. 2 is an exploded view of the exemplary shear of FIG. 1.

FIG. 2 shows an exploded view of the hydraulic shear 100. The hydraulic shear 100 includes a first jaw 102, a second jaw 104, and a pivot pin 106. In an embodiment as shown in FIG. 2, the first jaw 102 is a fixed jaw while the second jaw 104 is a pivoting jaw. In one embodiment, the first and second jaws 102, 104 include one or more blades 108, 110 therein. The blades 108, 110 may be configured to provide shearing forces to an object (not shown).

The first jaw 102 includes a first sidewall 112, and a second sidewall 114. The first and second sidewalls 112, 114 extend rearwardly and forwardly to unitarily form the first jaw 102. The first and second sidewalls 112, 114 define a pocket 116 therebetween. The second jaw 104 is positioned between the first and second sidewalls 112, 114 and partially disposed within the pocket 116 between the first and second sidewalls 112, 114.

Further, the first sidewall 112 and the second sidewall 114 define a first opening 118 and a second opening 120 therethrough. In an embodiment as shown in FIG. 2, the first opening 118 and the second opening 120 are co-axially disposed to each other. The second jaw 104 includes a third opening 122 disposed co-axially with respect to the first and second openings 118, 120. The pivot pin 106 extends through the first, second, and third openings 118, 120, and 122 to pivotally connect the first and second jaws 102, 104.

In an embodiment as shown in FIG. 2, the pivot pin 106 includes a head portion 124, and a rod portion 126. The head portion 124 is disposed in the first opening 118 at the first sidewall 112. The rod portion 126 extends from the head portion 124 and includes a threaded end 128 disposed at the second opening 120 of the second sidewall 114. Therefore, the second jaw 104 is slidably mounted on the pivot pin 106, and may be pivotable relative to the fixed first jaw 102.

The hydraulic shear 100 further includes an adjustment mechanism 130 coupled to the pivot pin 106, the first jaw 102, and the second jaw 104. The adjustment mechanism 130 is configured to slidably adjust a position of the second jaw 104 on the pivot pin 106 with respect to the first and second sidewalls 112, 114 of the first jaw 102 as will be explained in the present disclosure.

In an embodiment as shown in FIG. 2, the first sidewall 112 includes a slotted groove 132 adjacent to the first opening 118 therein. The slotted groove 132 is transversely disposed to the pivot pin 106. In an embodiment as shown in FIG. 2, the adjustment mechanism 130 includes a locking element 134 connected to the head portion 124 of the pivot pin 106. The locking element 134 is disposed in the slotted groove 132 and is configured to restrict a rotational movement of the pivot pin 106 with respect to the first and second jaws 102, 104.

In an embodiment as shown in FIG. 2, the shear 100 further includes an end cap 136 releasably fastened to the first sidewall 112. The end cap 136 is positioned facing the locking element 134 and releasably fastened to the first sidewall 112 using one or more threaded fasteners 138 such as, for example, hex-bolts.

In a further embodiment as shown in FIG. 2, the adjustment mechanism 130 further includes a bushing 140 slidably mounted on the rod portion 126 of the pivot pin 106. The bushing 140 is disposed between the first sidewall 112 of the first jaw 102 and the second jaw 104. The bushing 140 includes a flange portion 142, and a collar portion 144 disposed in a stepped relation to each other. The flange portion 142 is configured to abut the second jaw 104 while the collar portion 144 is configured to abut the head portion 124 of the pivot pin 106 on a side oppositely disposed to the locking element 134.

In a further embodiment as shown in FIG. 2, the flange portion 142 of the bushing 140 and the first sidewall 112 further include a pair of holes 146, 148 co-axially disposed with respect to each other. The holes 146, 148 are configured to slidably receive a pair of locking pins 150, 152 therein. The locking pins 150, 152 are configured to rotationally lock the bushing 140 with respect to the first sidewall 112.

In an embodiment as shown in FIG. 2, the adjustment mechanism 130 further includes a nut 154 disposed at the second sidewall 114 of the first jaw 102. The nut 154 is releasably engaged to the second sidewall 114, and is adjustably engaged with the threaded end 128 of the pivot pin 106. In one embodiment, the nut 154 includes a cap portion 156, and a flange portion 158 radially extending from the cap portion 156. The cap portion 156 is substantially elongated relative to the flange portion 158. The cap portion 156 of the nut 154 includes internal threads 160 configured to threadably engage with the threaded end 128 of the pivot pin 106. Further, the second sidewall 114, and the flange portion 158 of the nut 154 include one or more holes 162, 164 configured to receive threaded fasteners 166 therein. The threaded fasteners 166 releasably fasten the flange portion 158 onto the second sidewall 114 thus releasably engaging the nut 154 to the first jaw 102.

In an embodiment as shown in FIG. 2, the shear 100 may further include one or more shims 168 and low-friction plates 170, 172 disposed on the pivot pin 106 and located adjacent to the first and second jaws 102, 104. In an exemplary embodiment as shown in FIG. 2, the shear 100 may include one shim plate 168 and two low-friction plates 170, 172 respectively. The shim may be disposed abutting the second jaw 104 and a first low-friction plate 170 while a second low-friction plate 172 may be positioned abutting the flange portion 142 of the bushing 140 and the second jaw 104. The low-friction plates 170, 172 may be configured to reduce an amount of friction experienced by the second jaw 104 while the second jaw 104 pivots relative to the stationary second sidewall 114 and the stationary bushing 140.

Figure 3:
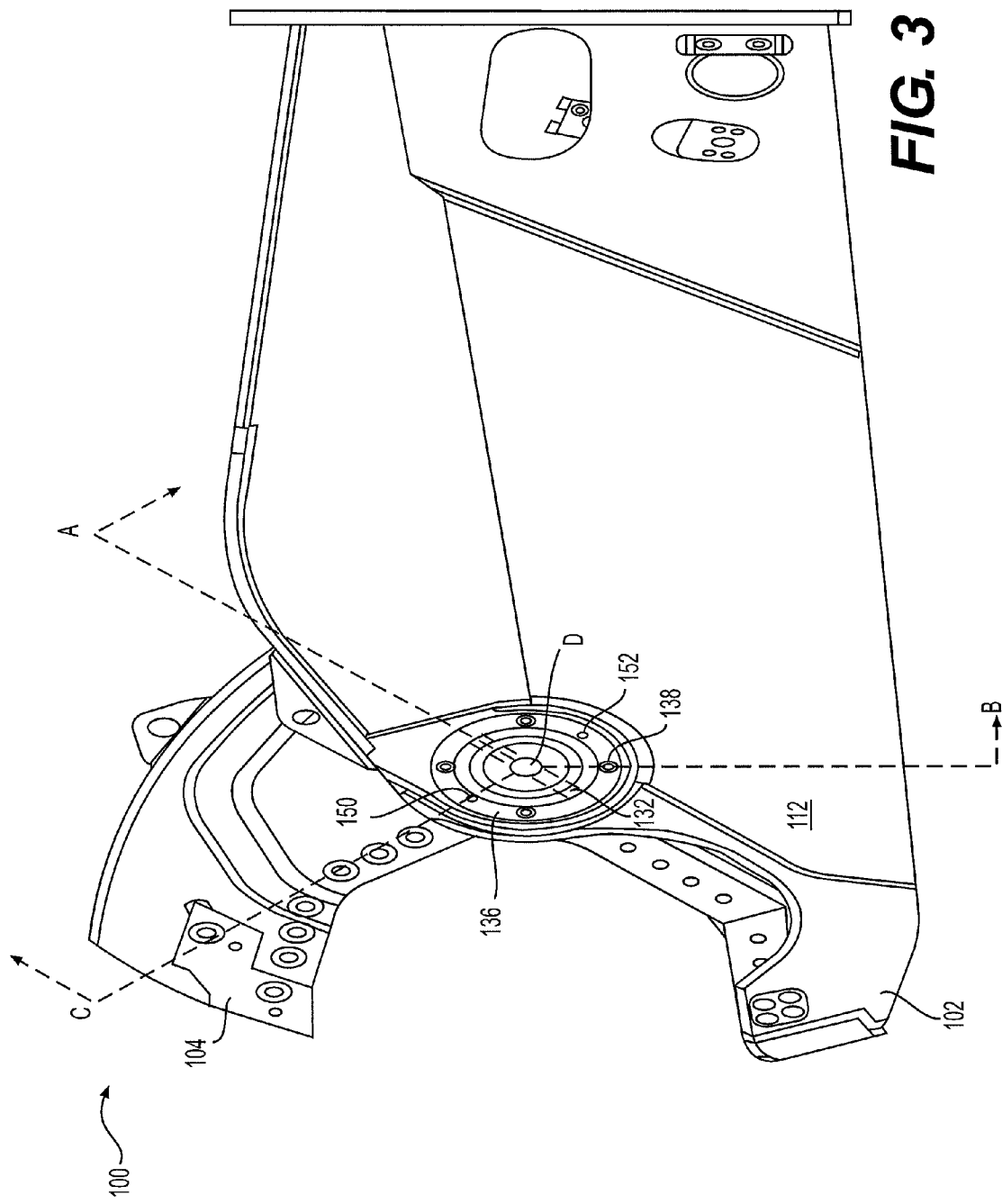
FIG. 3 is a side orthogonal view of the shear showing a threaded nut of an adjustment mechanism employed in the exemplary shear of FIGS. 1-2.

In the preceding embodiment, the adjustment mechanism 130 may be configured to stack the shims 168, the low-friction plates 170, 172, and the second jaw 104 substantially proximal to the second sidewall 114 such that the second jaw 104 is slidably positioned on the pivot pin 106 and brought closer to the blades 108 on the second sidewall 114. Further, the second jaw 104 is simultaneously configured to maintain an upright position with respect to the pivot pin 106. However, in alternative embodiments, the adjustment mechanism 130 may slidably adjust the position of the second jaw 104 closer to the second sidewall 114 of the first jaw 102 depending on a location of the blades 108, 110 on the first and second jaws 102, 104. In an exemplary embodiment as shown in FIGS. 2-3, the slotted groove 132 on the first sidewall 112 and the locking element 134 disposed therein may lie about the sectional plane A-D while the threaded fasteners 138 releasably engaging the end cap 136 to the first sidewall 112 may be located in the sectional plane B-D. Further, the locking pins 150, 152 disclosed herein may lie about the sectional plane C-D. Furthermore, the threaded fasteners 166 releasably engaging the nut 154 to the second sidewall 114 may be located in the sectional plane B-D. Although, sectional planes A-D, B-D, and C-D are disclosed herein, these planes are merely exemplary and nature, and hence, non-limiting of this disclosure. Any angularly disposed sectional planes may be used to locate the slotted groove 132, the locking pins 150, 152, and the threaded fasteners 138, 166.

Figure 4:
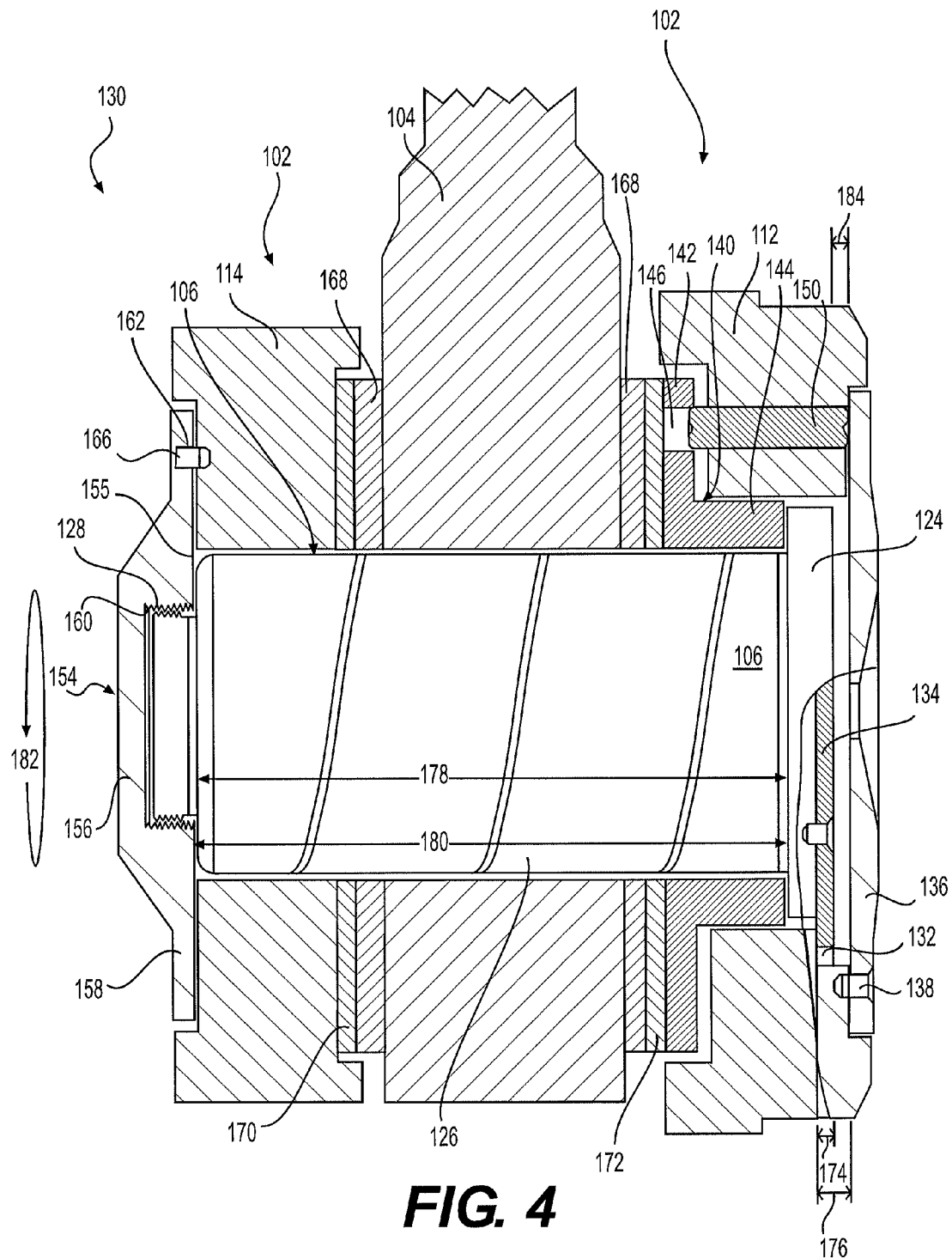
FIG. 4 is a sectional view of the shear showing an operation of the adjustment mechanism.

In a further embodiment as shown in FIG. 4, a thickness 174 of the locking element 134 is less than a depth 176 of the slotted groove 132. A length 178 of the rod portion 126 of the pivot pin 106 is less than a width 180 between head portion 124 and a surface 155 of nut 154. The pivot pin 106 is axially, and rotationally constrained by the internal threads 160 of the nut 154 at the cap portion 156 of the nut 154, the slotted groove 132 and the end cap 136. The bushing 140 is rotationally constrained by the locking pins 150, 152 slidably disposed within holes 146, 148 on the bushing 140 and the first sidewall 112.

Upon prolonged operation of the shear and repeated opening and closing of the jaws to accomplish shearing, wear may occur on the shim and the low-friction plates 170, 172 thus reducing a thickness of the shims 168 and/or a thickness of the low-friction plates 170, 172. This reduction in thicknesses may cause a slack between the second jaw 104 and the adjacent shims 168 and the low-friction plates 170, 172. The aforesaid slack may thus render the second jaw 104 slidable on the pivot pin 106 and in some cases may render the second jaw 104 susceptible to wobbling on the pivot pin 106.

Referring to FIG. 4, an operation of the adjustment mechanism 130 is now initiated to slidably position the second jaw 104 with respect to the first and second sidewalls 112, 114 of the first jaw 102 while slidably stacking the shims 168, the low-friction plates 170, 172 and the second jaw 104 substantially proximal to the second sidewall 114 of the first jaw 102. The threaded fasteners 166 at the nut 154 are unfastened to disengage the nut 154 from the second sidewall 114 of the first jaw 102. Thereafter, the nut 154 is rotated in a clockwise direction 182 (when viewing from the left in case of a right-handed internal thread 160 of the nut 154). However, in alternative embodiments, the nut 154 may be rotated in a counter-clockwise direction (when viewing from the left in case of a left-handed internal thread 160 of the nut 154).

Rotation of the nut 154 in the clockwise direction 182 brings about an axial displacement 184 of the pivot pin 106 towards the nut 154 and consequently, the locking element 134 at the head portion 124 of the pivot pin 106 is also axially displaced away from the end cap 136 and towards the slotted groove 132. Subsequently, the head portion 124 of the pivot pin 106 pushes the collar portion 144 of the bushing 140 causing the flange portion 142 of the bushing 140 to push the low-friction plates 170, 172, the shims 168, and the second jaw 104 towards the second sidewall 114 of the first jaw 102.

Pushing of the shims 168, the low-friction plates 170, 172, and the second jaw 104 towards the second sidewall 114 may reduce any slack between the shims 168, the low-friction plates 170, 172 and the second jaw 104. Further, this reduction of slack may in turn compact the shims 168, the low-friction plates 170, 172, and the second jaw 104 at the second sidewall 114 of the first jaw 102. Furthermore, the compaction of the shims 168, the low-friction plates 170, 172, and the second jaw 104 at the second sidewall 114 of the first jaw 102 may in turn render the second jaw 104 upright on the pivot pin 106 and substantially proximal to the blade 108 on the second sidewall 114.

After the slack has been reduced, the threaded fasteners 166 at the nut 154 may be re-positioned within the holes 162 and 164 (FIG. 2) to fasten the nut 154 onto the second sidewall 114, and positionally lock the pivot pin 106 and the second jaw 104 with respect to the first jaw 102. Further, as disclosed herein, the second jaw 104 can be configured to maintain a substantially upright position on the pivot pin 106 until further wear occurs on the shims 168 and/or the low-friction plates 170, 172.

For the purposes of illustration and clarity in understanding, various embodiments presented herein exemplarily disclose various dimensional parameters thereof. Further, a working of the adjustment mechanism 130 has been explained with reference to the exemplary embodiments. However, it is to be noted that the embodiments disclosed herein are merely exemplary in nature and hence, non-limiting of this disclosure. Hence, numerous modifications may be made to the various dimensional parameters disclosed herein without deviating from the scope of this disclosure.

INDUSTRIAL APPLICABILITY

Typically, shears employed on heavy construction machinery are subjected to large reaction forces from shearing objects. Further, repeated opening and closing of jaws during prolonged operation of the shear may cause wear on the shim plates and low-friction plates. This wear may cause a slack in the shim plates and the low-friction plates thus rendering the pivotable jaw susceptible to slide or wobble on the pivot pin during operation. Therefore, subsequent use of the shear thereafter may entail an increased amount of effort from the jaws to accomplish the shearing or crushing of the objects.

One way of compensating for slack in the plates stacked and disposed on the pivot pin is to replace the plates. However, replacing the plates altogether may require operating personnel to disassemble the jaws and re-insert new plates. Further, additional costs are incurred by way of replacement and downtimes of the shear. Furthermore, this method may be tedious and cumbersome while also requiring expensive tools to pivotally unfasten and re-fasten the jaws to each other. Further, conventional methods of adjusting a relative position of the jaws may entail substantial downtimes of the shear and thus, affect the overall profitability associated with operation of the shear.

With implementation of the present adjustment mechanism 130 in shears 100, a wear in the shims 168 and the low-friction plates 170, 172 may be compensated by slidably positioning the second jaw 104 with respect to the first jaw 102 such that slack between the first and second jaws 102, 104 is reduced. Further, the adjustment mechanism 130 disclosed herein, prolongs a use of the shims 168 and the low-friction plates 170, 172 by allowing an operator to take into consideration a service life remaining in the shims 168 and the low-friction plates 170, 172 before deciding to replace the shims 168 and the low-friction plates 170, 172 altogether. Therefore, the adjustment mechanism 130 may mitigate additional costs that were previously incurred with a replacement of the shims 168 and the low-friction plates 170, 172.

In order to adjust a relative positioning of the jaws 102, 104 and maintain a pre-determined shearing force of the shear 100, the nut 154 may be disengaged from the first jaw 102 by unfastening the threaded fasteners 166, and rotated to slidably displace the second jaw 104 on the pivot pin 106. This process of compacting the shims 168, the low-friction plates 170, 172 and the second jaw 104 to positionally adjust the second jaw 104 may be easy, quick, and may require minimal effort. Therefore, use of the adjustment mechanism 130 may reduce downtimes of the shear, and hence, enhance an overall profitability associated with operation of the shear.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

I claim:

1. A hydraulic shear comprising:
   a first jaw including a first sidewall with a first opening therethrough and a second sidewall with a second opening therethrough;
   a second jaw disposed between the first and second sidewalls, the second jaw including a third opening;
   a pivot pin including a head portion and a rod portion, the pivot pin extending through the first, second, and third openings to pivotally connect the first and second jaws; and
   an adjustment mechanism coupled to the first jaw, the second jaw, and the pivot pin, the adjustment mechanism configured to slidably adjust a position of the second jaw on the pivot pin with respect to the first and second sidewalls, the adjustment mechanism including:

the head portion of the pivot pin being in the first opening, and the rod portion of the pivot pin extending from the head portion and including a threaded end adjacent the second opening; a nut adjustably engaged with the threaded end the nut being releasably secured to the second sidewall and rotatable to move the head portion relative to the second jaw to slidably adjust the position of the second jaw on the pivot pin with respect to the first and second sidewalls; and at least one shim and at least one low-friction plate disposed on the pivot pin, and located between the first and second jaws.

2. The hydraulic shear of claim 1, wherein the at least one shim and at least one low-friction plate includes a plurality of shims and low-friction plates, and wherein the adjustment mechanism is further configured to slidably stack the shims, the low-friction plates, and the second jaw substantially proximal to one of the first sidewall and the second sidewall of the first jaw.

3. The hydraulic shear of claim 1, wherein the first sidewall includes a slotted groove adjacent to the first opening therein, the slotted groove transversely disposed to the pivot pin.

4. The hydraulic shear of claim 3, wherein the adjustment mechanism includes a locking element connected to the head portion of the pivot pin and disposed in the slotted groove, the locking element configured to restrict a rotational movement of the pivot pin with respect to the first and second jaws.

5. The hydraulic shear of claim 4, wherein a thickness of the locking element is less than a depth of the slotted groove.

6. The hydraulic shear of claim 4, wherein the adjustment mechanism further includes:
a bushing slidably mounted on the rod portion of the pivot pin and disposed between the first sidewall and the second jaw.

7. The hydraulic shear of claim 6, wherein the bushing includes:
a collar portion disposed in abutting relation with the head portion of the pivot pin; and
a flange portion disposed in abutting relation with the second jaw.

8. The hydraulic shear of claim 7, wherein the flange portion and the first sidewall further include a pair of co-axial holes, the holes configured to slidably receive one or more locking pins therein to rotationally lock a position of the bushing with respect to the first jaw.

9. A shear comprising:
a fixed jaw;
a pivoting jaw;
a pivot pin including a head portion and a rod portion, the pivot pin extending through openings on the fixed and pivoting jaws; and
an adjustment mechanism coupled to the fixed jaw, the pivoting jaw, and the pivot pin, the adjustment mechanism configured to slidably adjust a position of the pivoting jaw longitudinally of the pivot pin towards a side of the fixed jaw, the adjustment mechanism including:

the head portion of the pivot pin being in a first opening in the fixed jaw, and the rod portion of the pivot pin extending from the head portion and including a threaded end adjacent the second opening in the fixed jaw; a nut adjustably engaged with the threaded end the nut being releasably secured to a sidewall of the fixed jaw and rotatable to move the head portion relative to the pivoting jaw to slidably adjust the position of the pivoting jaw on the pivot pin with respect to the fixed jaw; and at least one shim and at least one low-friction plate disposed on the pivot pin, and located between the fixed and pivoting jaws.

10. The hydraulic shear of claim 9, wherein the at least one shim and at least one low-friction plate includes a plurality of shims and low-friction plates, and wherein the adjustment mechanism is configured to slidably stack the shims, the low-friction plates, and the pivoting jaw substantially proximal to the sidewall of the fixed jaw.

11. The hydraulic shear of claim 9, wherein the fixed jaw includes first and second sidewalls with first and second openings therein, wherein the pivoting jaw includes a third opening therein.

12. The hydraulic shear of claim 11, wherein the first sidewall includes a slotted groove adjacent to the first opening therein, the slotted groove transversely disposed to the pivot pin.

13. The hydraulic shear of claim 12, wherein the adjustment mechanism includes a locking element connected to the head portion of the pivot pin and disposed in the slotted groove, the locking element configured to restrict a rotational movement of the pivot pin with respect to the fixed and pivoting jaws.

14. The shear of claim 13, wherein a thickness of the locking element is less than a depth of the slotted groove.

15. The shear of claim 13, wherein the adjustment mechanism further includes:
a bushing slidably mounted on the rod portion of the pivot pin and disposed between the first sidewall and the pivoting jaw.

16. The shear of claim 15, wherein the bushing includes:
a collar portion disposed in abutting relation with the head portion of the pivot pin; and
a flange portion disposed in abutting relation with the pivoting jaw.

17. The hydraulic shear of claim 16, wherein the flange portion and the first sidewall further include a pair of co-axial holes, the holes configured to slidably receive one or more locking pins therein to rotationally lock a position of the bushing with respect to the fixed jaw.

* * * * *

UNITED STATES PATENT AND TRADEMARK OFFICE
CERTIFICATE OF CORRECTION

| | |
|---|---|
| PATENT NO. | : 9,518,372 B2 |
| APPLICATION NO. | : 13/870416 |
| DATED | : December 13, 2016 |
| INVENTOR(S) | : John Kevin Clemons |

It is certified that error appears in the above-identified patent and that said Letters Patent is hereby corrected as shown below:

In the Claims

Column 8, Line 32, In Claim 13, delete "The hydraulic shear of claim 12," and insert -- The shear of claim 12, --.

Column 8, Line 50, In Claim 17, delete "The hydraulic shear of claim 16," and insert -- The shear of claim 16, --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*